REAMER-STABILIZER

Original Filed March 14, 1968 7 Sheets-Sheet 1

William R. Garrett
INVENTOR.

BY Murray Robman
ATTORNEY

REAMER-STABILIZER

Original Filed March 14, 1968 7 Sheets-Sheet 2

William R. Garrett
INVENTOR.

BY Murray Robinson
ATTORNEY

William R. Garrett
INVENTOR.

BY Murray Robinson
ATTORNEY

REAMER-STABILIZER

Original Filed March 14, 1968 7 Sheets-Sheet 4

William R. Garrett
INVENTOR.

BY Murray Robinson
ATTORNEY

William R. Garrett
INVENTOR.

BY Murray Robinson
ATTORNEY

REAMER-STABILIZER

Original Filed March 14, 1968 7 Sheets-Sheet 6

William R. Garrett
INVENTOR.

BY Murray Robinson
ATTORNEY

REAMER-STABILIZER

Original Filed March 14, 1968 7 Sheets-Sheet 7

William R. Garrett
INVENTOR.

BY Murray Robinson
ATTORNEY

United States Patent Office

Re. 27,781
Reissued Oct. 9, 1973

27,781

REAMER-STABILIZER

William R. Garrett, Midland, Tex., assignor to Smith International, Inc.

Original No. 3,494,432, dated Feb. 10, 1970, Ser. No. 723,639, Mar. 14, 1968, which is a continuation-in-part of abandoned application Ser. No. 598,737, Dec. 2, 1966. Application for reissue Feb. 4, 1972, Ser. No. 223,684

Int. Cl. E21b *9/08, 9/24;* E21c *23/00*

U.S. Cl. 175—339 19 Claims

Matter enclosed in heavy brackets [ ] appears in the original patent but forms no part of this reissue specification; matter printed in italics indicates the additions made by reissue.

ABSTRACT OF THE DISCLOSURE

Combination reamer-stabilizer for air drilling employs three rollers mounted on parallel hollow shafts each press fitted into a blind threaded connector having a hole extending part way through and communicating with radial ports in hollow shafts to convey air through unit. Locking pins through shafts and connectors prevent separation. Rollers have sintered tungsten carbide inserts around outer periphery to both reduce roller wear and ream hole being bored. Radial hole through each shaft bleeds air to a flat along side of shaft to blow foreign matter out of space between roller and shaft.

This application is a continuation-in-part of my prior application Ser. No. 598,737, filed Dec. 2, 1966, entitled "Reamer Stabilizer," now abandoned.

In a modification a cage having top and bottom plates connected by vertical bars receives rollers between the bars. The rollers are mounted on tubular shafts whose ends are press fitted into sockets in the plates. Top and bottom threaded connectors are integral with or welded to the plates. Fluid passages in connectors are in communication with shafts through ports in plates.

CROSS-REFERENCES TO RELATED APPLICATIONS

This application pertains to improvements upon the inventions disclosed in applications assigned to the assignee of the present invention as follows:

Ser. No. 369,801 filed May 25, 1964, by Joseph A. Kloesel, Jr. and James W. Dixon entitled "Bore Control Device," now Pat. No. 3,303,900 issued Feb. 14, 1967;

Ser. No. 442,710 filed Mar. 25, 1965, by Joseph A. Kloesel, Jr. and Sam T. Crews entitled "Roller Reamer," now Pat. No. 3,306,379 issued Feb. 28, 1967.

BACKGROUND OF THE INVENTION

(1) Field of the invention

This invention relates to earth boring by the rotary method and more particularly to the drilling of blast holes in strip mining as described more fully in said application Ser. No. 442,710, filed Mar. 25, 1965, entitled "Roller Reamer," air being used as the preferred drilling fluid to cool the bit and carry away the detritus. The holes drilled are usually of the order of something less than one hundred feet long and usually only one stabilizer-reamer tool is used, same being located adjacent the bit. The tool prevents drill stem wobble adjacent the bit, thereby increasing bit life by preventing unequal loading of the bit cones. The tool also facilitates drilling a straight full gage hole.

(2) Description of the prior art

With the tool disclosed in the aforementioned application entitled "Roller Reamer," there are seven members to be simultaneously press fitted during assembly, namely, three shafts, three bars, and one pipe. It is an object of the present invention to simplify the manufacture of a tool of this type and an added advantage of the invention is the resultant reduction in cost of the tool.

With tools of the type disclosed in the aforementioned "Roller Reamer" application the air passages are necessarily of small cross section. An advantage of the present invention is that larger air passages can be provided and the passages can be manufactured at less expense.

A further object of the invention is to provide larger diameter rollers than was possible in the construction of the aforementioned "Roller Reamer," thereby to increase roller life by reducing the number of roller revolutions per bit revolution, and enabling the roller shafts to be of larger diameter to withstand lateral loading, and enabling the rollers to have greater thickness and a larger number of carbide inserts per unit area. At the same time, it is desired to maintain all of the rollers at the same level or plane so as to insure proper stabilizing action. In this regard the invention is to be distinguished from the tool described in U.S. Pat. No. 1,772,491 issued Aug. 12, 1930 which discloses a reamer having a plurality of large diameter rollers each roller being positioned at a different level or plane along the length of the tool.

In conventional roller reamers the rollers are circumferentially disposed around a central body which provides a flow passage and is connected at its ends to other drill string members. An example of such construction is given by U.S. Pat. 1,812,039 to Deakins. To give greater strength, the central body may be provided with radial wings extending between the rollers, as shown in U.S. Pat. No. 1,174,568 to Griffin. With such construction it is possible for detritus to accumulate between the central body and roller to such an extent that the roller is locked against rotation. An object of the invention is to provide a roller reamer of adequate strength whose rollers will not be likely to lock.

SUMMARY OF THE INVENTION

According to the invention the tool includes upper and lower connector bodies interconnected by three tubular shafts equiazimuthally spaced around the tool axis, with a tungsten carbide studded roller mounted on each shaft. Each connector body has a flow passage extending only part way therethrough toward the other connector body but far enough to be in communication with radial ports in the ends of the several shafts. Fluid flow through the tool is thus through the tubular shafts, eliminating the need for a separate central flow pipe and leaving more room for the rollers. The shafts are preferably made large enough to transmit torque and axial stress and bending moment from one connector body to the other, thereby eliminating the need for separate load bars for this purpose and leaving more room for the rollers. Air is supplied to each roller-shaft annulus through a radial port in each shaft which places the longitudinal flat on the surface of the shaft at the side thereof in communication with the main flow passage through the interior of the tubular shaft.

If the usage is such as to require load bars or braces between the rollers the bars preferably are made of tricrescent or generally triangular wedge or chock shaped cross section, correlative to the spaces between the rollers, whereby maximum cross sectional area is obtained without reduction of the space available for the rollers. Due to the absence of any central body at the axis of the reamer, there is little likelihood of detritus collecting in sufficient quantity to lock the rollers. Preferably the braces are made integral with top and bottom plates receiving the roller shafts, the roller cage comprising the plates and braces being welded to or integral with the top and bottom connectors.

BRIEF DESCRIPTION OF THE DRAWINGS

For a detailed description of a preferred embodiment of the invention reference will now be made to the accompanying drawings wherein.

DESCRIPTION OF THE PREFERRED EMBODIMENT

Figure 1:
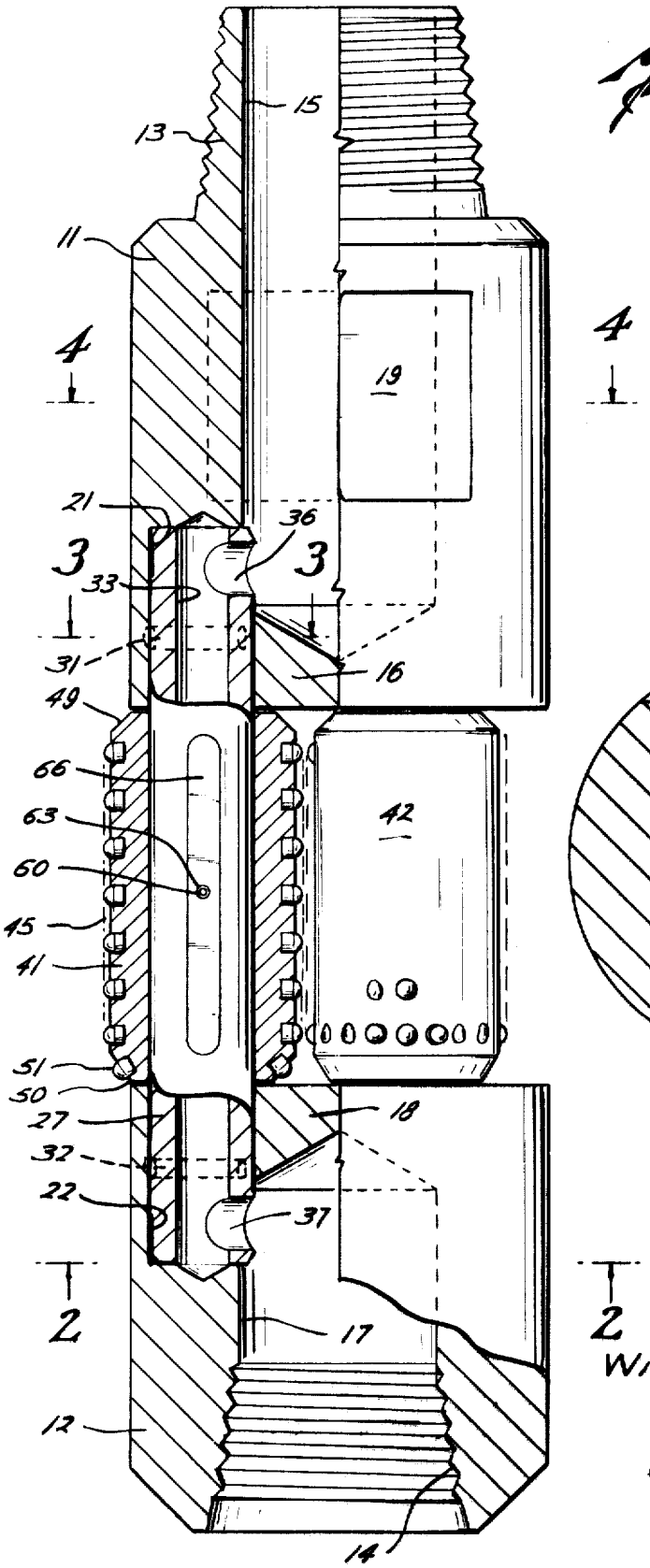
FIG. 1 is an elevation, partly in section, showing a reamer-stabilizer tool embodying the invention.

Referring now to FIG. 1, there is shown a reamer-stabilizer tool comprising upper and lower generally cylindrical steel connector bodies 11, 12. Upper body 11 is provided with an externally threaded pin 13 and lower connector body 12 is provided with an internally threaded box 14. Upper connector body 11 has an axial flow passage 15 extending from the top nearly to the bottom thereof terminating at wall 16. Lower connector body 12 has an axial flow passage 17 extending from the bottom nearly to the top thereof terminating at wall 18.

Figure 4:
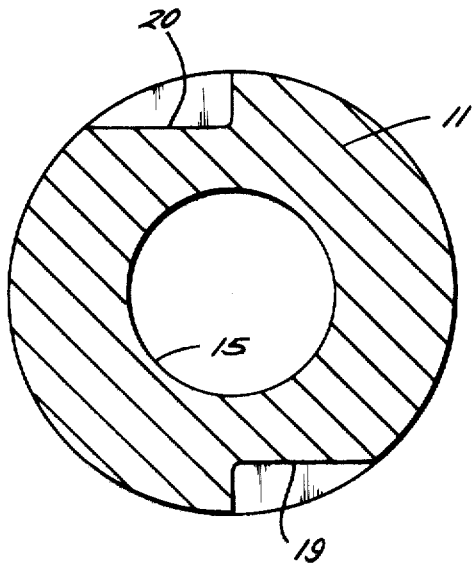
FIG. 4 is a section taken at plane 4—4 of FIG. 1.

Referring now also to FIG. 4, upper connector body 11 is provided with wrench receiving flat sockets, 19, 20 below the pin 13 to facilitate screwing the tool to the drill pipe above and the drill bit below when the tool is assembled in the drill string for use.

Referring again to FIG. 1, the connector bodies 11, 12 are provided with three equiazimuthally spaced longitudinally extending sockets in its medially directed end, that is, its end opposite from the threaded end thereof. One of these sockets is shown at 21 in the upper connector body and another at 22 in the lower connector body. Each of these sockets is positioned so that its generally cylindrical periphery overlaps the generally cylindrical periphery of the axial passage in the connector body both axially and radially placing each socket in communication with the axial passage in the respective connector body.

The three sockets in the lower connector body are in vertical register with the three sockets in the upper connector body. Three tubular steel shafts 27, 28, 29 (see FIG. 2) are disposed with their upper ends pressed into the three sockets in upper connector body 11 and their lower ends pressed into the three sockets in lower connector body 12. The ends of the shafts are beveled to facilitate the press fit assembly. Each shaft is positively secured in place at each end by means of a lock pin, as shown at 31 and 32 in connection with shaft 27 (FIGS. 1 and 3), the pin intersecting both the connector body and the shaft and being driven in place.

Each shaft has an axial flow passage therein as shown at 33, 34, 35. Each shaft has at its upper end and at the lower end a radial flow passage, such as shown at 36, 37 with respect to shaft 27, the lower radial flow passages of all three shafts being shown at 37, 38, 39 in FIG. 2. These six radial flow passages, communicate with the axial flow passages in the respective shafts and the axial flow passages in the adjacent connector bodies. There is thus provided fluid passage means extending through the tool from the upper end to the lower end thereof, the flow passages through the shafts being in parallel.

Figure 2:
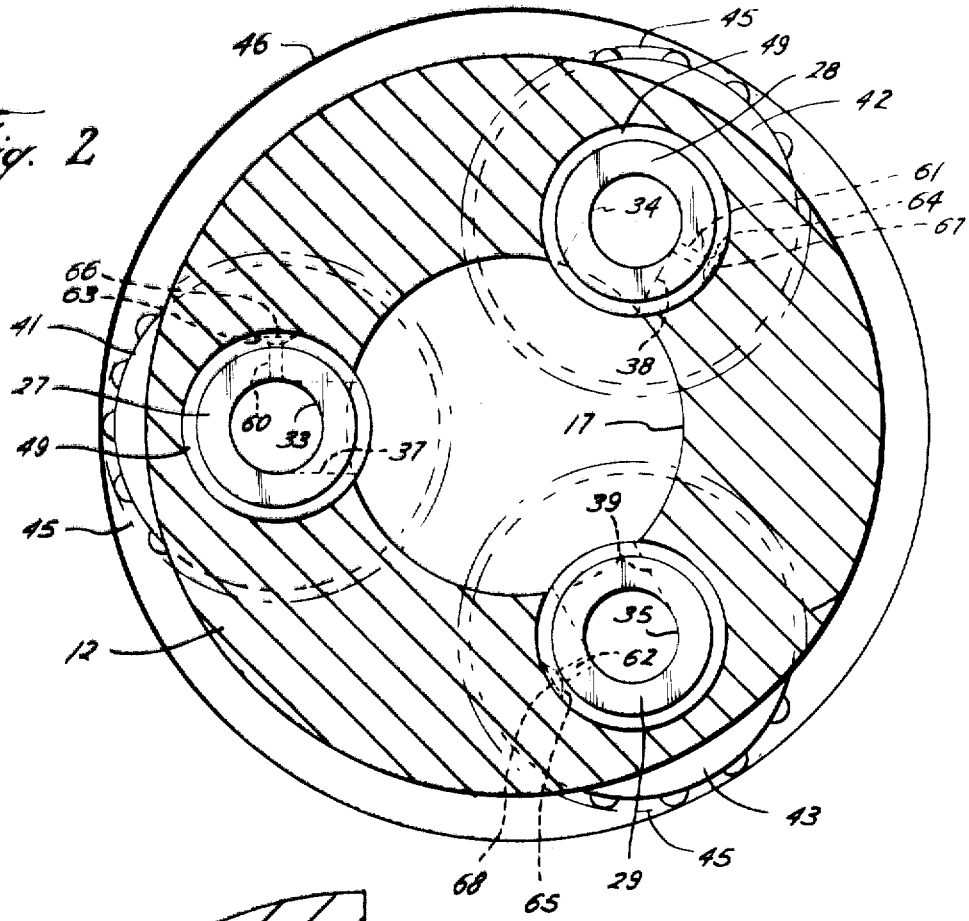
FIG. 2 is a section taken in plane 2—2 of FIG. 1.
Figure 3:
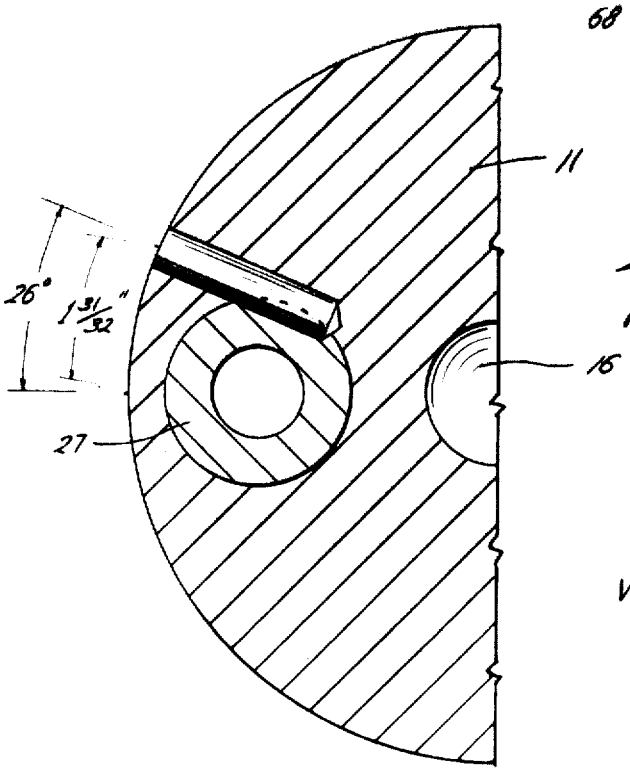
FIG. 3 is a section taken at plane 3—3 of FIG. 1.
Figure 5:
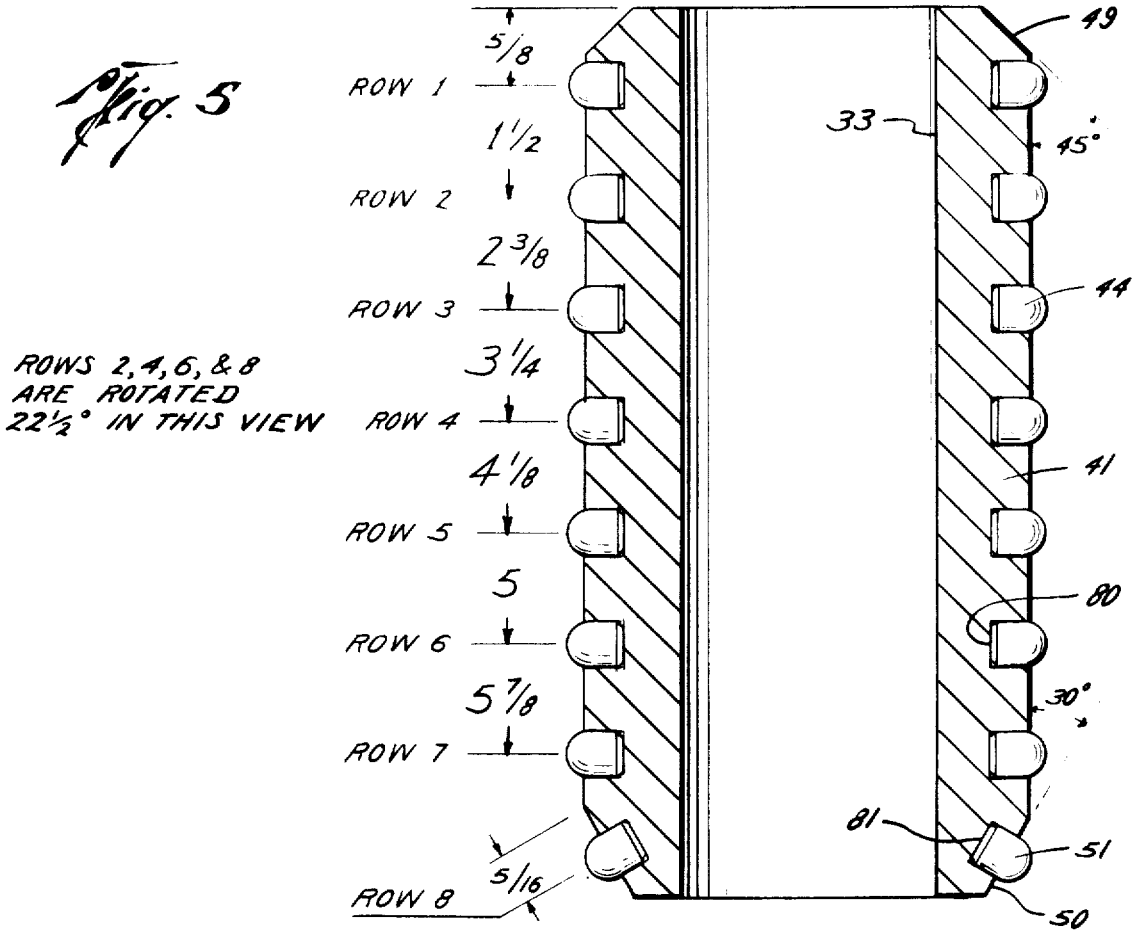
FIG. 5 is a vertical section through one of the rollers of the tool shown in FIG. 1.
Figure 6:
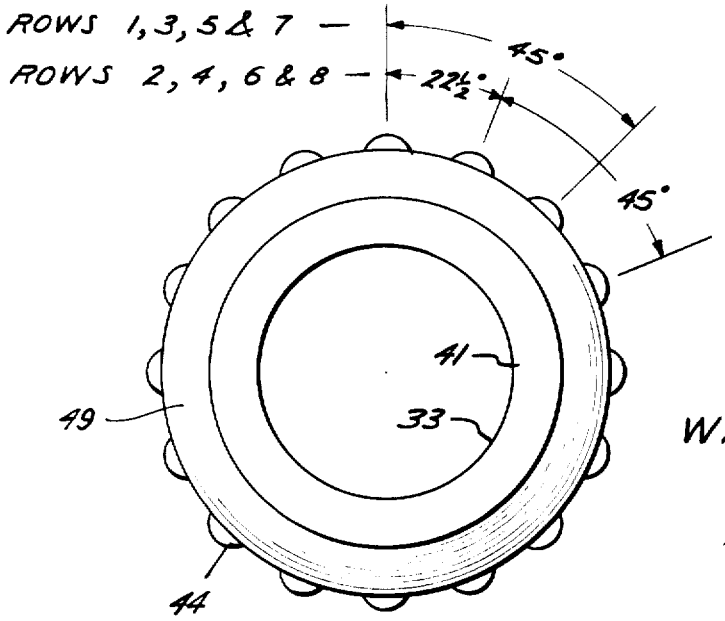
FIG. 6 is a top view of the roller shown in FIG. 5.

Rotatably mounted on each shaft is a generally cylindrical steel roller as shown at 41, 42, 43 in FIG. 2. Press fitted into sockets in the outer periphery of each roller are a plurality of bullet shaped, round nosed, generally cylindrical sintered tungsten carbide pellets as shown at 44 in FIGS. 5 and 6; the envelope of the outer peripheries of pellets being indicated at 45 in FIGS. 1 and 2. As shown at 46 in FIG. 2, the circle tangent to the tips of the pellets 44 when in their outermost positions defines the hole size reamed by the tool. The ends of each roller are beveled as shown at 49, 50 to facilitate vertical movement of the tool. To initiate reaming and reduce wear the lower bevel 50 of each roller is also studded with a plurality of sintered tungsten carbide pellets press fitted into sockets therein as indicated at 51 in FIG. 1.

Extending radially through each shaft is a port as shown at 60, 61, 62 in FIG. 2. Each port terminates in a bevel as shown at 63, 64, 65 connecting with an axial flat on the side of the roller as shown at 66, 67, 68. There is thus provided fluid passage means for air from the drill stem to be admitted to the region between each roller and is shaft for blowing detritus therefrom and cooling the shaft and roller.

Although no load bars are shown interconnecting the upper and lower connector bodies it would be within the purview of the invention to use such load bars as disclosed in the aforementioned application for a "Roller Reamer."

However, if the usage is such as to require strengthening of the tool, it is preferable to integrate the load bars or braces with the walls 16, 18 to form an integral case. Two such constructions are shown in FIGS. 7–9 and 10–12.

Figure 7:
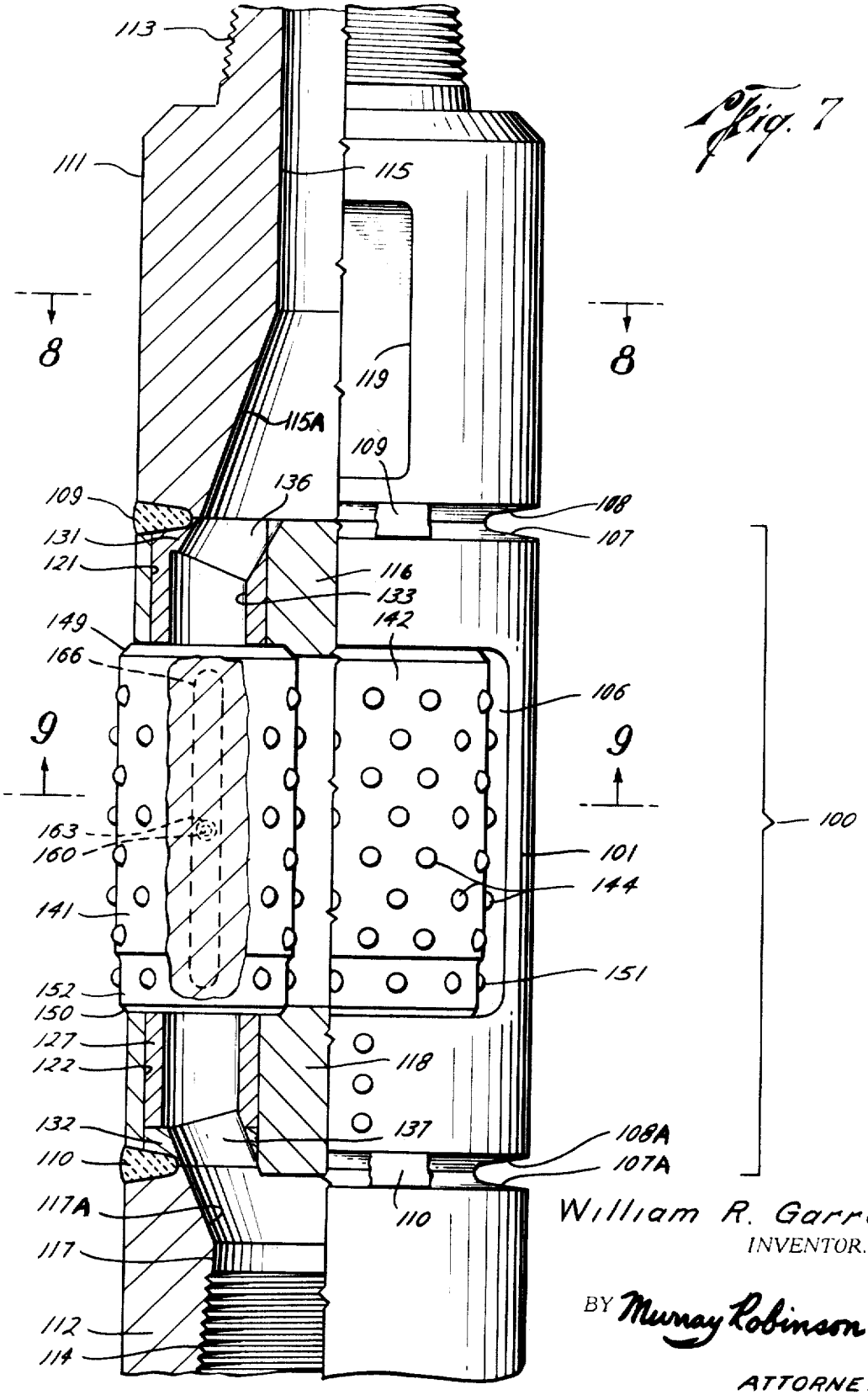
FIG. 7 is an elevation, partly in section, showing another form of reamer-stabilizer tool embodying the invention.

Referring now to FIG. 7 there is shown a reamer-stabilizer tool comprising upper and lower generally cylindrical steel connector bodies 111, 112. Upper body 111 is provided with an externally threaded pin 113 and lower connector body 112 is provided with an internally threaded box 114. Upper connector body 111 has an axial flow passage 115 extending from the top to the bottom thereof, the upper part of the passage being generally cylindrical and the lower part flaring to a larger diameter. Lower connector body 112 has an axial flow passage 117 extending from the bottom nearly to the top thereof, the lower part of the passage being slightly tapered flaring toward the mouth of the box and the upper part flaring upwardly to a larger diameter.

Figure 9:
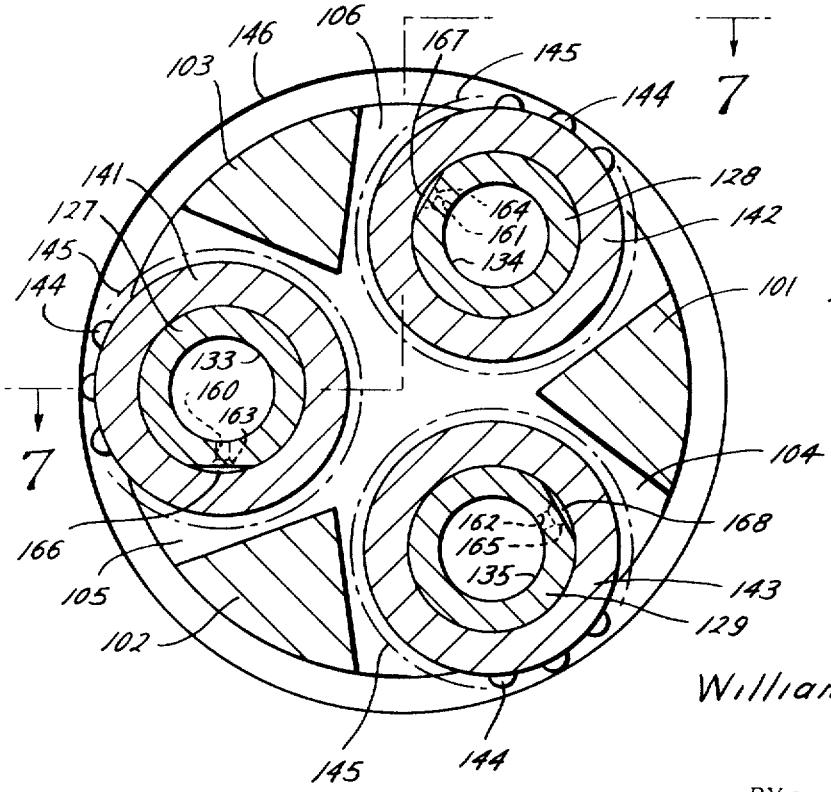
FIG. 9 is a section taken at plane 9—9 of FIG. 7.

Referring now also to FIG. 9, in between the two connector bodies there is a cage 100 comprising top and bottom walls or plates 116, 118 integrally connected by three load bars or braces 101, 102, 103. The cage is formed from a single piece of bar stock by boring a hold axially through the bar and then milling three equiazimuthally spaced slots 104, 105, 106, the walls of each slot converging slightly toward the axis of the cage. Each of the bars 101, 102, 103 has a cross sectional shape defined by an arc of a circle and two chords which may be called a bisegmental cross section or substantially triangular cross section.

Weld bevels 107, 108 are provided at the adjacent peripheries of the cage wall 116 and upper connector body 111 whereby the cage can easily be welded to the connector body 111 as shown at 109. In similar fashion, the lower connector body 112 and the cage wall 118 are beveled at 107A, 108A, and welded together as shown at 110.

Figure 8:
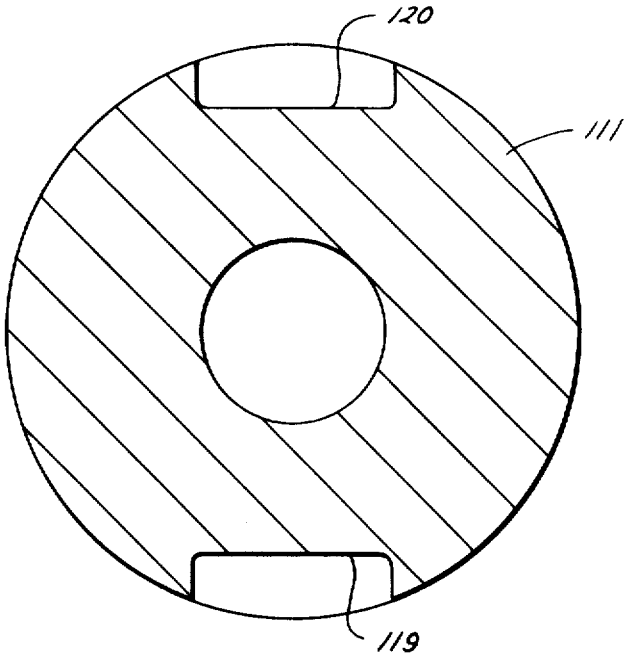
FIG. 8 is a section taken at plane 8—8 of FIG. 7.

Referring now also to FIG. 8, upper connector body 111 is provided with wrench receiving sockets 119, 120 below the pin 113 to facilitate screwing the tool to the drill pipe above and the drill bit below when the tool is assembled in the drill string for use.

Referring again to FIGS. 7 and 9, each of the walls 116, 118 is provided with three equiazimuthally spaced longitudinally extending sockets. One of these sockets is shown at 121 in the upper wall 116 and another at 122 in the lower wall 118. Each of these sockets is positioned so that its generally cylindrical periphery overlaps the generally conical periphery of the adjacent flaring portion 115A, 117A of the axial passage 115, 117 in the adjacent connector body placing each socket in communication with the axial passage in the respective connector body.

The three sockets in the lower connector body are in vertical register with the three sockets in the upper connector body. Three tubular steel shafts 127, 128, 129 (see FIG. 9) are disposed with their upper ends pressed into the three sockets in wall 116 and their lower ends pressed into the three sockets in wall 118. The ends of the shafts are beveled to facilitate the press fit assembly.

Each shaft has an axial flow passage therein as shown at 133, 134, 135. The upper end of each flow passage 133, 134, 135 is initially closed by a web, the remnant of such a web 131 (FIG. 7) being shown at the upper end of passage 133. After each shaft is pressed in place a disc is welded into the bottom of the socket at the lower end of the shaft the remnant of such a disc 132 being shown at the lower end of passage 133. The flow passages 133, 134, 135 of each shaft communicate at their upper and lower ends with flow passages 115, 117 through slanting flow passages such as shown at 136, 137 with respect to shaft 127. These slanting passages are bored through the webs 131 and discs 132 after the shafts are pressed into place and before the cage is welded to the connector bodies. There is thus provided fluid passage means extending through the tool from the upper end to the lower end thereof, the flow passages through the shafts being in parallel.

Rotatably mounted on each shaft is a generally cylindrical steel roller as shown at 141, 142, 143 in FIG. 9. Press fitted into sockets in the outer periphery of each roller are a plurality of bullet shaped, round nosed, generally cylindrical sintered tungsten carbide pellets 144 which may be the same as pellets 44 shown in FIGS. 1, 2, 5 and 6; the envelope of the outer peripheries of pellets 144 being indicated at 145 in FIG. 9. As shown at 146 in FIG. 9, the circle tangent to the tips of the pellets 144 when in their outermost positions defines the hole size reamed by the tool. The ends of each roller are beveled as shown at 149, 150 to facilitate vertical movement of the tool. To initiate reaming and reduce wear a reduced diameter land 152 adjacent the lower end of each roller is also studded with a plurality of sintered tungsten carbide pellets press fitted into sockets therein as indicated at 151 in FIG. 7.

Extending radially through each shaft is a port as shown in 160, 161, 162 in FIG. 9. Each port terminates in a bevel as shown at 163, 164, 165 connecting with an axial flat on the side of the roller as shown at 166, 167, 168. There is thus provided fluid passage means for air from the drill stem to be admitted to the region between each roller and its shaft for blowing detritus therefrom and cooling the shaft and roller.

Figure 10:
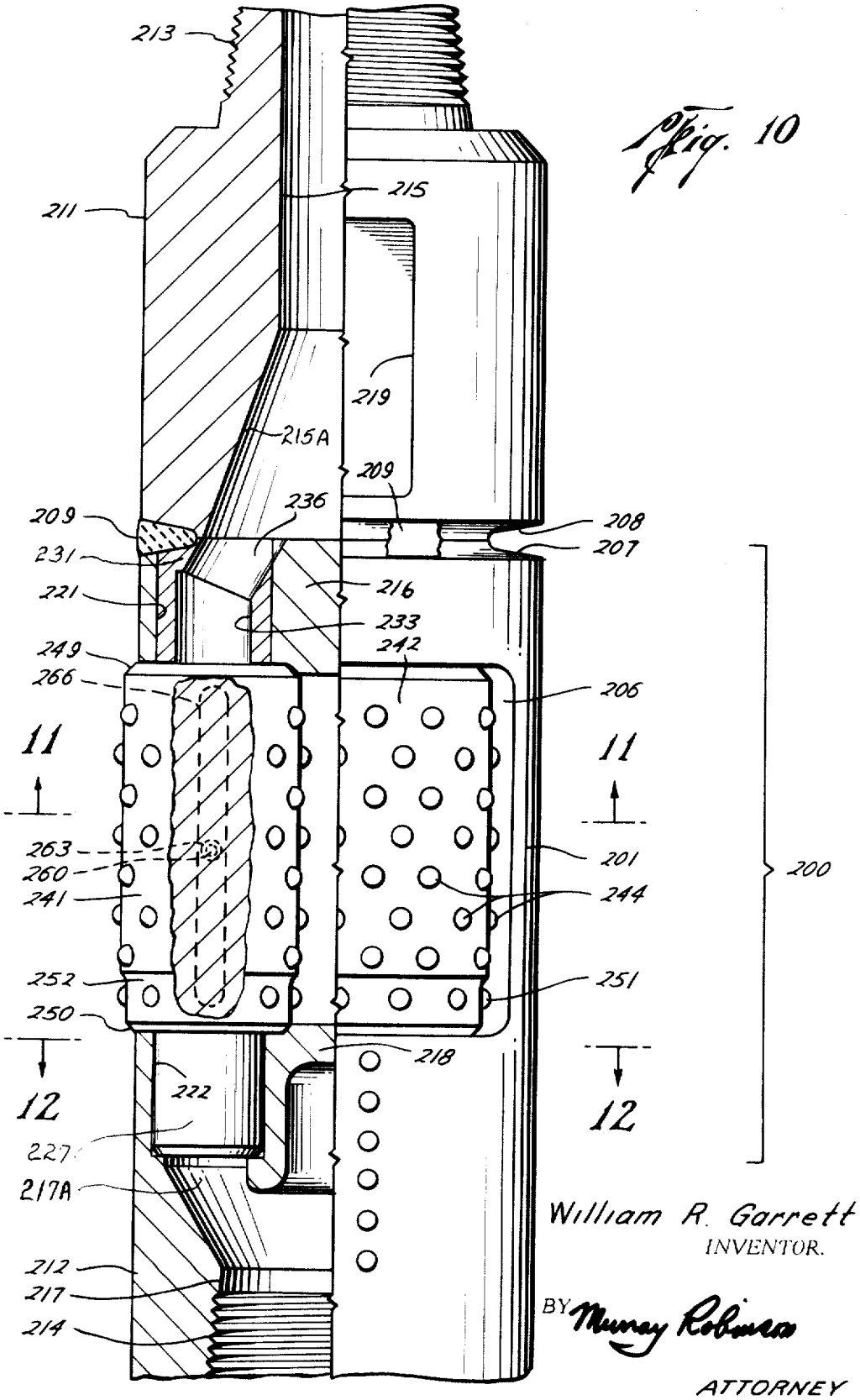
FIG. 10 is an elevation, partly in section, showing another form of reamer stabilizer tool embodying the invention.

Referring now to FIG. 10, there is shown a reamer-stabilizer tool comprising upper and lower generally cylindrical steel connector bodies 211, 212. Upper body 211 is provided with an externally threaded pin 213 and lower connector body 212 is provided with an internally threaded box 214. Upper connector body 211 has an axial flow passage 215 extending from the top to the bottom thereof, the uper part of the passage being generally cylindrical and the lower part flaring to a larger diameter. Lower connector body 212 has an axial flow passage 217 extending from the bottom nearly to the top thereof terminating at wall 218, the lower part of the passage being slightly tapered flaring toward the mouth of the box and the middle part of the flow passage connecting to three slanting branch passages such as 217A equally spaced apart around passage 217.

Figure 11:
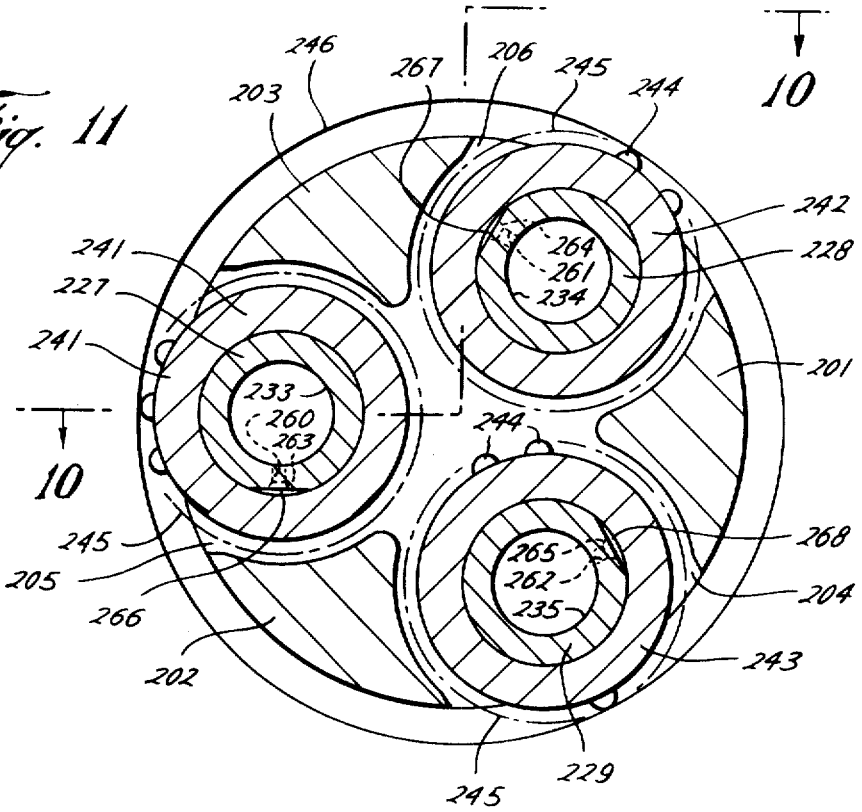
FIG. 11 is a section taken at plane 11—11 of FIG. 10.
Figure 12:
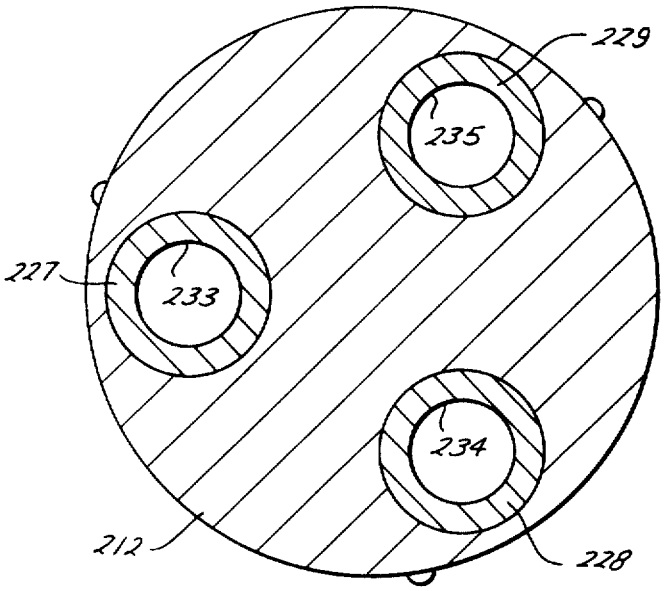
FIG. 12 is a section taken at plane 12—12 of FIG. 10.

Referring now also to FIG. 11, extending upwardly from wall 218 and cast integral therewith are three load bars or braces 201, 202, 203, with slots 204, 205, 206 formed therebetween. A horizontal wall or plate 216 is integrally connected to the tops of the load bars. The load bars and walls 216, 218 form a cage 200 similar to cage 100 except that cage 200 is cast integral with lower connector body 211. Each of the bars 201, 202, 203 has a cross section defined by the arc of a circle having the diameter of walls 216, 218 intersected by the arcs of two smaller circles of slightly larger diameter than the envelope 245 defined by the outer peripheries of pellets 244 in rollers 241, 242, 243. The cross sections of the bars 201, 202, 203 may therefore be described as tricrescent or as substantially triangular.

Weld bevels 207, 208 are provided at the adjacent peripheries of cage way 216 and upper connector body 211 whereby the cage can easily be welded to the connector body 211 as shown at 209.

Upper connector body 211 is provided on opposite sides thereof with a pair of wrench receiving sockets, such as that shown at 219, below the pin 213, to facilitate screwing the tool to the drill pipe above and the drill bit below when the tool is assembled in the drill string for use.

Referring now also to FIG. 2, each of the walls 216, 218 is provided with three equiazimuthally spaced longitudinally extending sockets. One of these sockets is shown at 221 in wall 216 and another at 222 in wall 218. Each socket in wall 216 is in communication with the downwardly flaring portion 215A of the axial passage 215 in the upper connector body 211. Each socket in wall 218 is in communication with one of branch passages 217A in the lower connector body 212.

The three sockets in the lower connector body are in vertical register with the three sockets in the upper connector body. Three tubular steel shafts 227, 228, 229 (see also FIGS. 11 and 12) are disposed with their upper ends pressed into the three sockets in wall 216 and their lower ends pressed into the three sockets in wall 218. The ends of the shafts are beveled to facilitate the press fit assembly.

Each shaft has an axial flow passage therein as shown at 233, 234, 235. The flow passage in each shaft communicates and at its lower end with one of the slanting flow passages 217A. The upper end of each flow passage 233, 234, 235 is initially closed by a web, the remnant of such a web 231 (FIG. 10) being shown at the upper end of passage 233. After the shafts are pressed into the sockets and before wall 216 is welded to connector body 211, slanting flow passages 236 are bored through webs 231. There is thus provided fluid passage means extending through the tool from the upper end to the lower end thereof, the flow passages through the shafts being in parallel.

Rotatably mounted on each shaft is a generally cylindrical steel roller as shown at 241, 242, 243 in FIG. 11. Press fitted into sockets in the outer periphery of each roller are a plurality of bullet shaped, round nosed, generally cylindrical sintered tungsten carbide pellets 244, which may be the same as pellets 44 shown in FIGS. 1, 2, 5 and 6; the envelope of the outer peripheries of pellets 244 being indicated at 245 in FIG. 11. As shown at 246 in FIG. 11, the circle tangent to the tips of the pellets 244 when in their outermost positions defines the hole size reamed by the tool. The ends of each roller are beveled as shown at 249, 250 to facilitate vertical movement of the tool. To initiate reaming and reduce wear a reduced diameter land 252 adjacent the lower end of each roller is also studded with a plurality of sintered tungsten carbide pellets press fitted into sockets therein as indicated at 251 in FIG. 10.

Extending radially through each shaft is a port as shown at 260, 261, 262 in FIG. 11. Each port terminates in a bevel as shown at 263, 264, 265 connecting with an axial flat on the side of the roller as shown at 266, 267, 268. There is thus provided fluid passage means for air from the drill stem to be admitted to the region between each roller and its shaft for blowing detritus therefrom and cooling the shaft and roller.

Comparing the three embodiments of the invention, it will be noted that in the FIG. 1 embodiment, lock pins interconnect the connector bodies with the roller shafts to hold the tool together, whereas in the embodiment of FIG. 7 welds connect the connector bodies with the cage to hold the tool together, and in the embodiment of FIG. 10, a cage integral with the lower connector body is welded to the upper connector body to hold the tool together. In the FIG. 1 embodiment there is nothing between the rollers, whereas in the FIGS. 7 and 10 embodiments the load bars define slots receiving the rollers, the sides of the slots in the FIG. 10 embodiment being curved correlative to the rollers.

In all three embodiments the roller shafts are pressed into their sockets, and the roller shafts are tubular to provide flow passages through the tool and to supply fluid to the spaces between each roller and its shaft. In all three embodiments the central part of the tool between the rollers is open leaving space in which detritus accumulated on the rollers can fall away from the rollers, thereby to prevent their locking against rotation.

While a preferred embodiment of the invention has been shown and described, many modifications thereof can be made by one skilled in the art without departing from the spirit of the invention. For example the number of rollers and shafts need not be three, but may be more than three. A lesser number would not provide satisfactory stabilization however.

The 180 degree equiazimuthal spacing with three rollers and shafts provides the maximum roller size consistent with proper stabilizing action. None of the rollers has a diameter in excess of half the diameter of the full gage of the tool as defined by circle 46. Preferably all of the shafts are equiazimuthally spaced and all of the rollers have the same diameters so that the life expectancy of each roller will be the same. Because the rollers are of large diameter, the sockets 80, 81 in which the pellets 44, 57 are received can be closer together without their bottoms getting too close together due to radial convergence.

Although the tool has been described as a reamer stabilizer, by omitting the tungsten carbide pellets which serve not only as wear reducing means but also as means for reducing the earth formation at the sides of the earth bore, the tool would be a pure stabilizer. By using less than three rollers the tool would be primarily only a reamer. Other earth formation reducing means and wear reducing means than tungsten carbide pellets can be used.

The principal feature is the use of parallel flow passages through the several roller shafts eliminating the need for a central axial flow pipe and providing more room for larger rollers.

Because the tubular roller shafts themselves provide the main flow passage for the air or other drilling fluid, it is much easier to ventilate, cool, and lubricate the intra-roller-shaft regions with drilling fluid bled from the shafts. By virtue of the better ventilation and larger roller diameters, the tool operation and life is enhanced.

Although the tool is primarily intended for air drilling and mining, it has other uses such as in oil well drilling and with other drilling fluids, liquid and gaseous.

As compared to the roller-reamer of the aforementioned application, the elimination of the central flow passage pipe and the elimination of the three load bars or the integration thereof into a single member, effects a marked reduction in the number of component parts. By virtue of the fewer number of parts the cost and difficulty of manufacture of the tool is reduced.

It is claimed:

1. In a drilling tool comprising:

an upper connector body with means thereon for making connection of one end thereof with another drill string member thereabove, a lower connector body with means thereon for making connection of one end thereof with another drill string member therebelow, the improvements including an axial passage in each of said bodies extending from said end thereof but terminating short of said other end, a plurality of off-axial flow passages in each connector body extending from said other end toward said one end but terminating short of said one end, each of said off-axial passages communicating with the axial passage in the respective block, a plurality of *tubular* shafts disposed between said connector bodies each connected at one end to one of said off-axial passages in the upper connector body and each connected at its other end to one of said off-axial passages in the lower connector body, each tubular shaft providing a fluid flow passage and said fluid flow passage in each shaft being in communication at each end with the off-axial fluid flow passage to which the shaft is connected, and a roller rotatably mounted on each tubular shaft.

2. Tool according to claim 1 including fluid passage means through the wall of each tubular shaft placing the region between each roller and shaft in communication with the fluid passage through the shaft communicating with the off-axial fluid passages in the connector bodies.

3. Combination according to claim 1 wherein each tubular shaft is press fitted at each end into the adjacent off-axial passage in the connector body and including means mechanically locking each shaft end to the respective connector body.

4. Tool according to claim 1 in which there are three of said off-axial passages in each connector body, there are three of said shafts, and there are only three of said rollers, said shafts being equiazimuthally degrees apart.

5. Tool according to claim 4 including earth formation reducing means disposed around the periphery of each roller and projecting therefrom, the diameter of the circle defined by the tips of the earth formation reducing means being in excess of one-third and less than one-half the diameter of the circle defined by the outer periphery of the tips of the outermost earth formation means of all the rollers.

6. Tool according to claim 1 wherein the off-axial passages in each connector body overlap axially and radially the axial passage in each connector body.

7. Tool according to claim 6 wherein the ends of each shaft are received in the off-axial passages in the connector body and each shaft is provided at each end with a radial passage connecting with the axial passage therethrough and communicating with the axial passage in the respective connector body.

[8. A stabilizer tool including:

body means adapted for connection in a drill string, a plurality of colevel shafts connected to said body means, a roller rotatably mounted on each shaft, and fluid passage means extending through said tool from one end thereof to the other, the improvement according to which each said shaft has a fluid passage extending axially thereof, said fluid passages through said shafts being in parallel with each other, said flow passages forming part of said fluid passage means.

9. A reamer including:

body means adapted for connection in a drill string, an off-axial tubular shaft mounted on said body means, a roller rotatably mounted on said shaft, earth formation reducing means at the outer periphery of said roller, flow passage means in said body means communicating the ends of the tool with the interior of said tubular shaft, and flow passage means through the wall of said tubular shaft communicating the inside of said shaft with the region between said shaft and roller.]

10. A roller-stabilizer including:
upper and lower body means adapted for connection in a drill string,
three equiazimuthally spaced colevel tubular shafts connected to said body means,
a roller rotatably mounted on each shaft,
earth formation reducing and wear reducing means studding the outer periphery of each roller,
fluid passage means through each of said body means connecting each end of the tool with the interior of each shaft at the ends thereof,
said tubular shafts providing parallel fluid passage means constituting the sole means of fluid communication between the fluid passage means in the upper body means and the fluid passage means in the lower body means,
said shafts providing the sole means interconnecting said upper and lower body means.

[11. A tool comprising:
an upper member having a plurality of sockets in a lower face thereof,
a lower member having a plurality of sockets in an upper face thereof,
a plurality of shafts each having an axial fluid passage therein and each having an upper end received in one of said sockets in said upper member and each having a lower end received in one of said sockets in said lower member,
a roller rotatably mounted on each of said shafts,
connection means, connected to said upper member for making connection to a drill string member,
connection means connected to said lower member for making connection to a drill string member,
fluid passage means connecting the upper ends of the fluid passage in said shafts with the upper end of the first said connection means, and
fluid passage means connecting the lower ends of the fluid passage in said shafts with the lower end of the second said connection means.

12. Tool according to claim 11 including fluid passage means extending from the fluid passage in each of said shafts to the exterior of the shaft inside the roller mounted thereon.]

13. [Tool according to claim 11 including] *A tool comprising:*
*an upper member having a plurality of sockets in a lower face thereof,*
*a lower member having a plurality of sockets in an upper face thereof,*
*a plurality of shafts each having an axial fluid passage therein and each having an upper end received in one of said sockets in said upper member and each having a lower end received in one of said sockets in said lower member,* means securing the ends of said shafts in said sockets, said shafts being the sole means interconnecting said members,
*a roller rotatably mounted on each of said shafts,*
*connection means, connected to said upper member for making connection to a drill string member,*
*connection means connected to said lower member for making connection to a drill string member,*
*fluid passage means connecting the upper ends of the fluid passage in said shafts with the upper end of the first said connection means, and*
*fluid passage means connecting the lower ends of the fluid passage in said shafts with the lower end of the second said connection means.*

[14. Tool according to claim 11 wherein the brace means is integral with said members forming therewith a cage for said rollers.

15. Tool according to claim 14 wherein the cage is welded to the first said connection means and is integral with the second said connection means.

16. Tool according to claim 14 wherein said cage is welded to both of said connection means.

17. Tool according to claim 14 wherein each of said shafts makes an interference fit with said sockets in which its ends are received.

18. Tool according to claim 11 including brace means additional to said shafts interconnecting said members.

19. Tool according to claim 18 wherein said brace means is disposed between said rollers off-axially with respect to the vertical axis of the tool.

20. Tool according to claim 19 wherein the brace means are of bi-segmental transverse cross section.

21. Tool according to claim 19 wherein the brace means are of tri-crescent transverse cross section.

22. Tool according to claim 19 wherein the brace means are of generally triangular transverse cross section.

23. Tool according to claim 19 wherein the brace means have cross sections correlative to the paths swept by the outer peripheries of the rollers.

24. Tool according to claim 11 wherein each of said fluid passage means includes an axial fluid passage extending from said end of said connection means inwardly toward said members and a plurality of parallel branch fluid passages extending from said fluid passages in said shafts to said axial fluid passage.

25. Tool according to claim 24 including brace means separate from said shafts and interconnecting said members, said brace means being disposed between said rollers and off-axially relative to the vertical axis of the tool, said brace means being integral with said members forming therewith a roller cage, said branch fluid passages being formed entirely in said cage, said axial fluid passages each flaring toward said cage to communicate with each of said branch passages.

26. Tool according to claim 25 including transverse means at each end of said fluid passage in each shaft blocking the end of the passage except where said branch passage penetrates said transverse means.

27. Tool according to claim 26 wherein said transverse means includes a web integral with each shaft at one end thereof and a disc welded into the socket at the other end of each shaft.

28. A tool comprising:
a cage including an upper member, a lower member and a plurality of bars extending from the upper member to the lower member,
a plurality of shafts extending from the upper member to the lower member,
a roller carried on each shaft mounted to rotate about the axis of the shaft,
upper connector means connected to said upper member and lower connector means connected to said lower member, and
fluid passage means extending from said upper connection means to said lower connection means through said shafts.

29. Tool according to claim 28 wherein said bars are integral with said upper member and said lower member.

30. Tool according to claim 28 wherein from the portions of said fluid passage means extending through said shafts there are branches leading to the outer periphery of each shaft, each roller being rotatably mounted on the shaft over a portion of the shaft to which extends such branch.

31. Tool according to claim 30 wherein said shafts are three in number and are equiazimuthally spaced around the vertical axis of the tool, and said bars are three in number disposed between the rollers adjacent the outer periphery of the cage.]

*32. A drilling tool comprising*
*an upper body portion with means thereon for making connection of one end thereof with another drill string member thereabove,*
*a lower body portion with means thereon for making connection of one end thereof with another drill string member therebelow,*
*a plurality of shafts extending between said upper and*

*lower body portions off-axially with respect to said body portions,*

*a plurality of rollers each rotatably mounted on one of said shafts, and*

*fluid passage means extending through said tool from one end thereof to the other,*

*said fluid passage means including flow passages extending longitudinally in said shafts,*

*said flow passages providing the sole means of fluid communication between said upper and lower body portions,*

*the central part of said tool below said upper body portion and above said lower body portion being completely clear between said rollers.*

*33. Tool according to claim 32 including bar means for taking load extending between said upper and lower body portions.*

*34. Tool according to claim 32 including flow passage means in each shaft communicating the region between the shaft and roller with the flow passage extending longitudinally in the shaft.*

*35. Tool according to claim 32 in which there are three of said shafts disposed equiazimuthally apart around the axis of said body portions, there are three of said rollers each mounted on one of said shafts, and including earth formation reducing means disposed around the periphery of each roller and projecting therefrom, the diameter of the circle defined by the tips of the earth formation reducing means being in excess of one-third and less than one-half the diameter of the circle defined by the outer periphery of the tips of the outermost earth formation means of all the rollers.*

*36. Tool according to claim 35 including bar means for taking load extending between said upper and lower body portions.*

*37. Tool according to claim 35 including flow passage means in each shaft communicating the region between the shaft and roller with the flow passage extending longitudinally in the shaft.*

*38. Tool according to claim 37 including bar means for taking load extending between said upper and lower body portions.*

*39. A drilling tool comprising*

*an upper body portion with means thereon for making connection of one end thereof with another drill string member thereabove,*

*a lower body portion with means thereon for making connection of one end theerof with another drill string member therebelow,*

*a plurality of shafts extending between said upper and lower body portions off-axially with respect to said body portions,*

*a plurality of rollers each rotatably mounted on one of said shafts, and*

*fluid passage means extending through sadi tool from one end thereof to the other,*

*said fluid passage means including flow passages extending longitudinally in said shafts,*

*said flow passages providing the sole means of fluid communication between said upper and lower body portions, and flow passage means in each shaft communicating the region between the shaft and roller with the flow passage extending longitudinally in the shaft.*

*40. Tool according to claim 39 in which there are three of said shafts disposed equiazimuthally apart around the axis of said body portions, there are three of said rollers each mounted on one of said shafts, and including earth formation reducing means disposed around the periphery of each roller and projecting therefrom, the diameter of the circle defined by the tips of the earth formation reducing means being in excess of one-third and less than one-half the diameter of the circle defined by the outer periphery of the tips of the outermost earth formation means of all the rollers.*

*41. Tool according to claim 40 including bar means for taking load extending between said upper and lower body portions.*

References Cited

The following references, cited by the Examiner, are of record in the patented file of this patent or the original patent.

UNITED STATES PATENTS

| | | | |
|---|---|---|---|
| 1,139,529 | 5/1915 | Hughes | 175—227 |
| 1,532,553 | 4/1925 | Duda | 175—228 |
| 1,607,937 | 11/1926 | Aldrin | 175—227 |
| 1,730,301 | 10/1929 | Simpson | 175—340 |
| 2,549,420 | 4/1951 | Camp | 175—345 X |
| 3,303,900 | 2/1967 | Kloesel et al. | 175—339 |
| 3,306,379 | 2/1967 | Kloesel et al. | 175—345 |

FOREIGN PATENTS

| | | | |
|---|---|---|---|
| 177,476 | 3/1922 | Great Britain | 175—228 |
| 204,780 | 10/1923 | Great Britain | 175—227 |

DAVID H. BROWN, Primary Examiner

U.S. Cl. X.R.

175—345